United States Patent
Buckrucker et al.

[15] 3,680,428
[45] Aug. 1, 1972

[54] COLOR CODED MUSICAL NOTATION
[72] Inventors: Ludwig E. Buckrucker; Mary J. Buckrucker, both of 5901 Addison St., Chicago, Ill. 60634
[22] Filed: Nov. 19, 1970
[21] Appl. No.: 91,103

[52] U.S. Cl..................................................84/471
[51] Int. Cl...........................................G09b 15/02
[58] Field of Search..............................84/471, 472

*Primary Examiner*—Richard B. Wilkinson
*Assistant Examiner*—Lawrence R. Franklin
*Attorney*—Clarence A. O'Brien and Harvey B. Jacobson

[57] ABSTRACT

A color coded musical notation in which a student will place color coded disks on an existing conventional black and white notation with the color coded disks completely covering the conventional black musical notation with the colored disks and the apparatus for applying the same being provided in kit form in order to enable the color coded disks to be placed on the sheet music by individuals.

3 Claims, 4 Drawing Figures

PATENTED AUG 1 1972　　3,680,428

Ludwig E. Buckrucker
Mary J. Buckrucker
INVENTORS

BY Clarence A. O'Brien
and Harvey B. Jacobson
Attorneys

COLOR CODED MUSICAL NOTATION

Various difficulties are encountered by music students, teachers and others utilizing conventional sheet music which is printed in black and white. One of the problems encountered is difficulty in distinguishing the notations and their position on the staff when the sheet music is printed in conventional black and white. While some efforts have been made to provide distinguishing characteristics to the musical notations including the concept of merely coloring the musical notations, it has been found that when a musical notation is merely colored such as by printing on the staff with colored ink, there is still a problem of proper recognition and observation of the musical notation. In addition, music students could obtain substantial instructional benefit by taking conventional printed sheet music and applying the musical notations thereto.

Accordingly, it is an object of the invention to provide a kit in the form of colored disks which are in the exact shape and size as musical notations and which are glued to conventional black and white sheet music in overlying relation to musical notations to provide a color to each notation with the colors being preselected in accordance with a code with the colored disks also indicating whole notes, half notes and the like.

A further object of the invention is to provide a kit by which a conventional printed sheet music may be transformed to a color coded sheet music with notations thereon by practicing a particular procedural step as set forth to produce a color coded musical notation in which the colored disk actually is disposed on and forms a projection on the surface of the sheet music to render it more observable.

Still another object of the invention is to provide a color coded musical notation for sheet music, a kit for converting black and white sheet music to color coded musical notations and a procedure to be followed all of which are relatively simple to perform and yet facilitate the teaching of music to students and enable students and others to more readily discern the musical notations on the sheet music.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
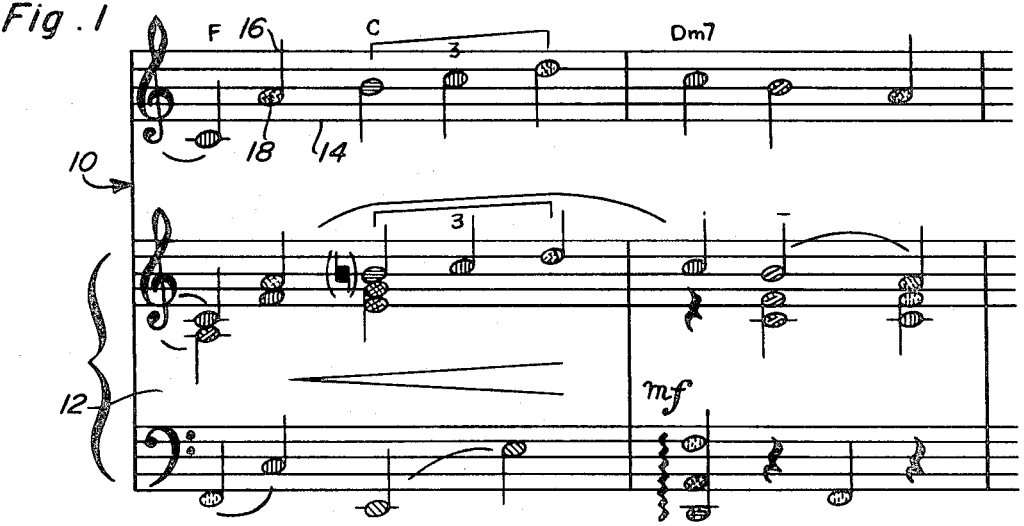
FIG. 1 is a plan view of a portion of sheet music in which the color coded disk has been mounted.

Referring now specifically to the drawings, the numeral 10 designates sheet music in the form of a panel of paper 12 or the like having the usual staff 14 printed thereon. Placed on the staff 14 is a plurality of notes 16 positioned in the usual orientation on the staff 14 to designate the music note desired. To this extent, the sheet music 10 formed by employing this invention is the same as conventional black and white printed sheet music with black and white musical notations thereon.

Each note 16 is provided with a colored disk 18 mounted thereon in overlying relation and completely covering relation to the usually provided black printed notation thus forming a colored musical notation in which the colored disk 18 is projecting above the surface of the sheet music.

Figure 4:
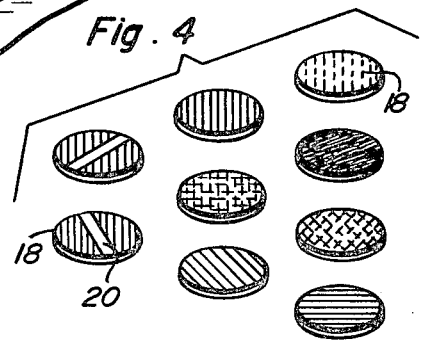
FIG. 4 is a group perspective view illustrating representative color coded disks.

The colored disks are coded to indicate the notes as follows: A-apricot; B-blue; C-carmen; D-dandelion; E-emerald; F-falcon; G-gray. Thus, as indicated, the colored disks 18 which are illustrated in FIG. 4 are oval shaped to conform with the shape and configuration to the usual black printed musical notations and the seven colors set forth above represent the notes and once the seven colors have been learned by a student, recognition of the musical notations will be expedited. Also, as indicated in FIG. 4, the disk 18 will include half notes by the provision of an uncolored stripe 20 diagonally of the disk which will again completely cover a half note conventionally printed in black on sheet music.

Figure 2:
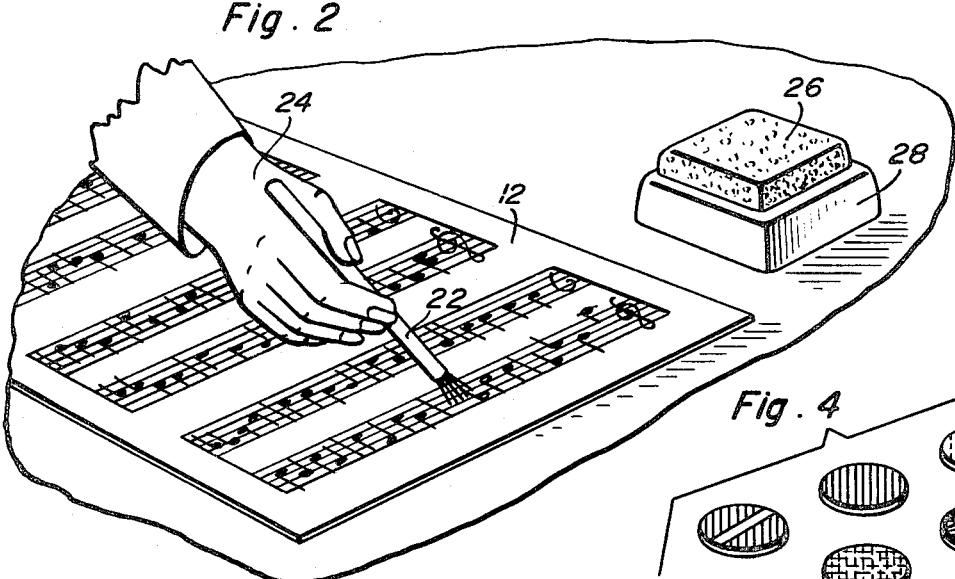
FIG. 2 is a perspective view illustrating initial procedural steps employed in applying the color coded disks to conventional black and white printed sheet music.
Figure 3:
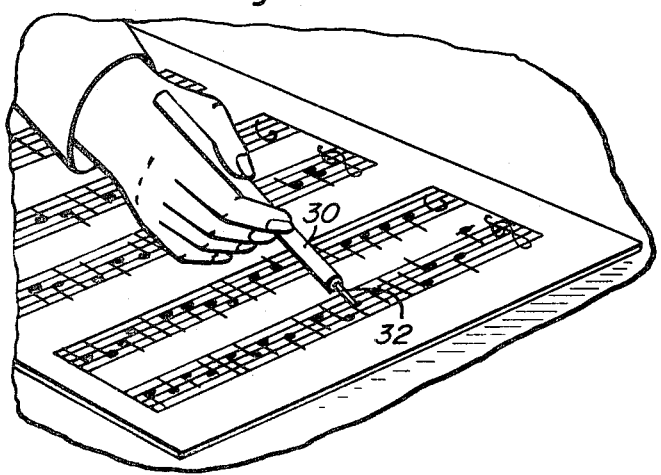
FIG. 3 is a perspective view illustrating another step in applying the color coded disks to the sheet music.

FIG. 2 illustrates the manner in which the color coded disks 18 are applied to a conventionally black and white printed sheet music. This procedure includes the use of a small brush 22 which is manually gripped and manipulated by the hand 24 of the student and is used in conjunction with a sponge 26 and sponge and water container 28 which retains the sponge in a dampened condition. The brush 22 which may be a conventional artist's brush is dampened or moistened by engaging the bristles thereof with the wet or moist sponge. The black printed musical notation on the conventional sheet music or paper 12 is then dampened or wetted by engagement of the brush therewith.

After the note printed in black on the sheet music has been moistened or wetted by the use of the artist brush 22, the appropriately colored disk 18 which has a water activated adhesive coating on the undersurface thereof is placed in overlying relation to the wetted black printed musical notation. This is accomplished by employing a pick 30 having a pointed end member 32 thereon which is used to engage the appropriate colored disk 18, pick it up and place it on the wetted black printed note and the pick may be employed to properly orient the oval shaped disk 18 in relation to the black printed musical note. Inasmuch as the black printed note has been well dampened, the surface adhesion of the wet note with the surface of the disk will retain the disk with it still being capable of moving the disk 18 so that it is properly aligned with the note thus enabling accurate orientation of the colored disk in relation to the note. As the adhesive dries, the colored disk 18 will be permanently and securely mounted on the sheet music to form the finished product 10.

The colored disk will be punched from the color printed paper with an adhesive backing and will be supplied in kit form in transparent envelopes constructed of glassine or the like to prevent the adhesive coded disks from adhering thereto. By providing a supply of colored disks separated as to their color and provided in envelopes, a student may effectively attach the colored disks to the sheet music by employing the small brush, sponge assembly and pick. If desired, the colored disks may be supplied in small transparent plastic boxes. A student when applying the colored disks to the notes will familiarize himself not only with the color code involved but also the positioning of the notes in relation to the staff thus increasing his understanding and knowledge of the musical notations and the finished sheet music which will enable a student to more effectively utilize the sheet music.

By employing the concepts of this invention, conventional black and white printed sheet music with black and white musical notations thereon is converted to sheet music with colored coded musical notations thereon with the color coded disks disposed on the upper surface of the sheet music and adhesively adhered thereto thus further enhancing the capability of observation due to the raised effect of the color coded disks. Practicing this procedure not only familiarizes a student with the notes and their position on the staff but also enables him to gain a more thorough knowledge and understanding of the relationship of the musical notations with the staff and a better understanding of the entire concept of sheet music.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with sheet music having a musical staff and musical notations thereon, the improvement comprising a plurality of oval-shaped colored disks adhesively mounted on the surface of the sheet music to provide colored musical notations thereon, said discs conforming exactly with, overlying and completely concealing the printed musical notations, each said disc being appropriately colored whereby the first letter of the name of the color is the same as the name of the musical note designated by that color.

2. The structure as defined in claim 1 wherein certain of said disks are provided with a white transverse stripe extending diagonally thereof to designate half notes and enable whole and half notes to be distinguished.

3. The structure as defined in claim 1 wherein said disks are color coded to designate musical notes as follows: A-apricot; B-blue; C-carmen; D-dandelion; E-emerald; F-falcon; G-gray.

* * * * *